United States Patent
Fedosik et al.

(10) Patent No.: US 8,899,802 B2
(45) Date of Patent: Dec. 2, 2014

(54) OPTICAL COMPONENT FOR ILLUMINATION PURPOSES

(75) Inventors: Dmitry Fedosik, Jena (DE); Wolfram Wintzer, Jena (DE); Silvana Kock, Jena (DE); Mohsen Mozaffari, Gera (DE)

(73) Assignee: Docter Optics SE (DE)

( * ) Notice: Subject to any disclaimer, the term of this patent is extended or adjusted under 35 U.S.C. 154(b) by 0 days.

(21) Appl. No.: 13/990,101

(22) PCT Filed: Nov. 11, 2011

(86) PCT No.: PCT/EP2011/005700
§ 371 (c)(1),
(2), (4) Date: May 29, 2013

(87) PCT Pub. No.: WO2012/072190
PCT Pub. Date: Jun. 7, 2012

(65) Prior Publication Data
US 2013/0250596 A1    Sep. 26, 2013

(30) Foreign Application Priority Data

Dec. 3, 2010 (DE) .......................... 10 2010 053 185
Feb. 1, 2011 (DE) .......................... 10 2011 009 951

(51) Int. Cl.
| F21S 8/10 | (2006.01) |
| F21V 5/00 | (2006.01) |
| G02B 3/04 | (2006.01) |
| G02B 3/08 | (2006.01) |

(52) U.S. Cl.
CPC .............. *F21S 48/1241* (2013.01); *G02B 3/04* (2013.01); *G02B 3/08* (2013.01); *F21V 5/00* (2013.01)

USPC ........................................... 362/511; 362/326

(58) Field of Classification Search
USPC ......... 362/511, 326, 616, 558, 331, 268, 335; 359/362, 385, 642
See application file for complete search history.

(56) References Cited

U.S. PATENT DOCUMENTS

| 2,469,080 A * | 5/1949 | Rosin et al. ............... 362/327 |
| 5,257,168 A | 10/1993 | Davenport et al. |
| 5,697,690 A | 12/1997 | Okuchi et al. |
| 6,709,141 B1 | 3/2004 | Sisti |
| 7,073,931 B2 | 7/2006 | Ishida |
| 8,342,726 B2 | 1/2013 | Fischer et al. |

(Continued)

FOREIGN PATENT DOCUMENTS

| DE | 1165514 B | 9/1964 |
| DE | 4121673 A1 | 1/1993 |

(Continued)

OTHER PUBLICATIONS

PCT International Search Report completed by the ISA/EP on Feb. 1, 2012 and issued in connection with PCT/EP2011/005698.

(Continued)

*Primary Examiner* — Nimeshkumar Patel
*Assistant Examiner* — Jacob R Stern
(74) *Attorney, Agent, or Firm* — Barnes & Thornburg LLP

(57) ABSTRACT

Optical component for illumination purposes, wherein the optical component comprises a monolithic body of transparent material, the monolithic body including a first light entry face, a first optically operative light exit face, a second optically operative light entry, and a second optically operative light exit face.

14 Claims, 8 Drawing Sheets

(56) References Cited

U.S. PATENT DOCUMENTS

| | | |
|---|---|---|
| 2004/0156209 A1 | 8/2004 | Ishida |
| 2007/0147055 A1 | 6/2007 | Komatsu |
| 2007/0201241 A1 | 8/2007 | Komatsu |
| 2010/0033849 A1 | 2/2010 | Seki et al. |

FOREIGN PATENT DOCUMENTS

| | | |
|---|---|---|
| DE | 4209957 A1 | 9/1993 |
| DE | 4320554 A1 | 12/1993 |
| DE | 19526512 A1 | 1/1996 |
| DE | 19742159 A1 | 4/1998 |
| DE | 102008026626 A1 | 12/2009 |
| DE | 10252228 B4 | 1/2010 |
| DE | 102008049168 A1 | 4/2010 |
| DE | 102009008631 A1 | 8/2010 |
| EP | 1113216 A2 | 7/2001 |
| EP | 1357334 A1 | 10/2003 |
| EP | 1666787 A1 | 6/2006 |
| EP | 1767398 A1 | 3/2007 |
| EP | 2113222 A1 | 11/2009 |
| EP | 2159479 A2 | 3/2010 |
| EP | 2221219 A1 | 8/2010 |
| FR | 2860280 A1 | 9/2004 |
| GB | 2365962 A | 2/2002 |
| GB | 2399622 B | 8/2005 |
| JP | 2005317226 | 11/2005 |
| WO | 2009/147070 A1 | 12/2009 |

OTHER PUBLICATIONS

PCT International Search Report completed by the ISA/EP on Mar. 19, 2012 and issued in connection with PCT/EP2011/005699.

PCT International Search Report completed by the ISA/EP on Feb. 15, 2012 and issued in connection with PCT/EP2011/005700.

PCT International Search Report completed by the ISA/EP on Feb. 1, 2012 and issued in connection with PCT/EP2011/005701.

PCT International Search Report completed by the ISA/EP on May 9, 2012 and issued in connection with PCT/EP2011/005702.

PCT International Search Report completed by the ISA/EP on May 4, 2012 and issued in connection with PCT/EP2011/005703.

International Preliminary Report on Patentability (Chapter I) issued on Jun. 4, 2013 in connection with PCT/EP2011/005698.

International Preliminary Report on Patentability (Chapter I) issued on Jun. 4, 2013 in connection with PCT/EP2011/005699.

International Preliminary Report on Patentability (Chapter I) issued on Jun. 4, 2013 in connection with PCT/EP2011/005700.

International Preliminary Report on Patentability (Chapter I) issued on Jun. 4, 2013 in connection with PCT/EP2011/005701.

International Preliminary Report on Patentability (Chapter I) issued on Jun. 4, 2013 in connection with PCT/EP2011/005702.

International Preliminary Report on Patentability (Chapter I) issued on Jun. 4, 2013 in connection with PCT/EP2011/005703.

* cited by examiner

OPTICAL COMPONENT FOR ILLUMINATION PURPOSES

CROSS REFERENCE TO RELATED APPLICATIONS

This application is the U.S. national phase of PCT/EP2011/005700 filed Nov. 11, 2011. PCT/EP2011/005700 claims the benefit under the Convention of German Patent Application Nos. 10 2010 053 185.5 and 10 2011 009 951.4 filed Dec. 3, 2010 and Feb. 1, 2011 (respectively).

FIELD OF THE INVENTION

The invention relates to an optical component for illumination purposes, in particular to a headlight lens for a vehicle headlight, in particular for a motor vehicle headlight, wherein the optical component for illumination purposes, in particular the headlight lens includes a particularly blank-molded monolithic body of transparent material including a light entry face and an optically operative (effective) light exit face.

BACKGROUND INFORMATION

DE 203 20 546 U1 discloses a lens blank-molded on both sides and having a curved surface, a planar surface and a retention edge integrally molded onto the lens' edge, wherein a supporting edge of a thickness of at least 0.2 mm and projecting with respect to the planar surface is integrally formed onto the retention edge. Herein, the supporting edge is integrally formed onto the outer circumference of the headlight lens. A further headlight lens having a supporting edge is disclosed e.g. by DE 10 2004 048 500 A1.

DE 20 2004 005 936 U1 discloses a lens for illuminating purposes, in particular a lens for a headlight for mapping or imaging light emitted from a light source and reflected by a reflector for generating a predetermined illumination pattern, said lens having two surfaces opposing each other, wherein areas of different optical dispersion effects are provided on at least a first surface.

DE 103 15 131 A1 discloses a headlight for vehicles having at least one extensive luminous field including a plurality of illuminating element (diode)-chips and an optical element arranged in the light path of the light beam emitted by the luminous field, wherein the illuminating element-chips of the luminous field are arranged in a common recess, and that the recess, on a side facing the direction of light emission, has an outer edge which, in relation to the elimination element-chips, is spatially arranged such that a predetermined gradient of light density is formed in a light dispersion of the headlight in the area of the outer edges.

DE 10 2004 043 706 A1 discloses an optical system for a motor vehicle headlight for dispersing a beam of light rays from an illuminant, with an optical primary element having an optical face including a break or discontinuity extending along a line, being provided, wherein the optical face is formed to be smooth at least on one side adjacent the discontinuity so that the beam of light rays is separated into two partial beams of light rays. Herein, it is provided that at least one of the partial beams of light rays has a sharp edge of limitation. Moreover, the optical system comprises an optical secondary element for mapping the sharp edge of limitation on to a predetermined light-dark-boundary.

EP 1 357 333 A2 discloses a light source device for a vehicle light which has an element emitting semiconductor light, which element is arranged on an optical axis of the light source device and emits its light essentially in an orthogonal direction with regard to the optical axis.

DE 10 2008 026 626 A1 discloses an illumination system including a surface-emitting diode and a central optical element which, together with the surface-emitting diode is aligned in relation to an optical axis, and by which light beams emitted essentially in parallel to the axis from the surface-emitting diode pass unfractured.

DE 1 165 514 discloses an axially symmetrical collective lens, in particular for signals, headlights and condenser systems which lens images/maps a light spot virtually or at infinity, exempt from spherical aberration.

Further illumination facilities in context with vehicles are disclosed by DE 42 09 957 A1, DE 41 21 673 A1, DE 43 20 554 A1, DE 195 26 512 A1, DE 10 2009 008 631 A1, U.S. Pat. No. 5,257,168 and U.S. Pat. No. 5,697,690.

It is, in particular, an object of the invention to suggest an improved optical element for illumination purposes. It is a further object of the invention to reduce the costs for manufacturing optical elements for illumination purposes.

SUMMARY

The aforementioned object is achieved by an optical component for illumination purposes, in particular a headlight lens for a vehicle headlight, in particular for a motor vehicle headlight, wherein the optical component for illumination purposes, in particular the headlight lens, includes a particularly blank-molded monolithic body of transparent material including an optically operative first light entry face, at least one optically operative second light entry face and at least one optically operative light exit face.

An optically operative or effective light entry face or surface or an optically operative or effective light exit face or surface is (constituted by) an optically operative or effective face surface of the monolithic body. In the sense of the invention, an optically operative surface is, in particular, a surface of the transparent body, at which surface light will be refracted, when using the optical component or the headlight lens, respectively, according to its purpose. In the sense of the invention, an optically operative surface is, in particular, a surface at which the direction of light which passes through this surface will be changed when using the optical component or the headlight lens, respectively, according to its purpose. The term 'face' will be used throughout the following disclosure including the claims, explicitly indicating that this is to include the term 'surface' as well.

In the sense of the invention, transparent material is particularly glass. In the sense of the invention, transparent material is particularly inorganic glass. In the sense of the invention, transparent material is particularly silicate glass. In the sense of the invention, transparent material is particularly glass as described in document PCT/EP2008/010136. In the sense of the invention, glass particularly comprises 0.2 to 2% by weight $Al_2O_3$,
0.1 to 1% by weight $Li_2O$,
0.3 (in particular 0.4) to 1.5% by weight $Sb_2O_3$,
60 to 75% by weight $SiO_2$,
3 to 12% by weight $Na_2O$,
3 to 12% by weight $K_2O$, and
3 to 12% by weight $CaO$.

In the sense of the invention, the term blank-molding is, in particular, to be understood in a manner that an optically operative surface is to be molded under pressure such that any subsequent finishing or post-treatment of the contour of this optically operative surface may be dispensed with or does not apply or will not have to be provided for, respectively. Consequently, it is particularly provided for that, after blank molding, a blank-molded surface is not ground, i.e. it need not be treated by grinding.

In an embodiment of the invention it is provided for that (the light entry faces and the light exit faces are arranged with respect to each other such that) at least 20% of the light (in particular from a light source of a vehicle headlight or a motor vehicle headlight, respectively) entering the first light entry face and exiting through the second light exit face will exit through the second light exit face after having exited from the monolithic body through the first light exit face and having entered the monolithic body through the second light entry face.

In another embodiment of the invention it is provided for that (the light entry faces and the light exit faces are arranged, with respect to each other, such that) at least 90% of the light (in particular from a light source of a vehicle headlight or a motor vehicle headlight, respectively) entering the first light entry face and exiting from the second light exit face will exit through the second light exit face after having exited from the monolithic body through the first light exit face and entered into the monolithic body through the second light entry face.

In another embodiment of the invention it is provided for that (the light entry faces and the light exit faces are arranged, with respect to each other, such that) at least 10%, in particular at least 20%, of the light (in particular from a light source of a vehicle headlight or a motor vehicle headlight, respectively) entering the first light entry face and exiting through the second light exit face will exit through the second light exit face without having exited from the monolithic body through the first light exit face and without having entered the monolithic body through the second light entry face.

In a yet further embodiment of the invention a light tunnel is provided between the first light entry face and the first light exit face. In a yet further embodiment of the invention a light tunnel is provided between the second light entry face and the second light exit face.

In another embodiment of the invention the second light entry face lies opposite to the first light exit face. In another embodiment of the invention the second light entry face is separated from the first light exit face by a particularly wedge-shaped gap. In an embodiment of the invention the first light exit face amounts to at least 50% of the second light entry face. In another embodiment of the invention the second light entry face amounts to at least 50% of the first light exit face.

In another embodiment of the invention the monolithic body includes at least one optically operative third light entry face and at least one optically operative third light exit face. In another embodiment of the invention it is provided for that (the light entry faces and the light exit faces are arranged relative to each other such that) at least 20% of the light entering the second light entry face and exiting through the third light exit face (in particular from a light source of a vehicle headlight or of a motor vehicle headlight, respectively) exits through the third light exit face after having exited from the monolithic body through the second light exit face and having entered the monolithic body through the third light entry face. In another embodiment of the invention it is provided for that (the light entry faces and the light exit faces are arranged relative to each other such that) at least 10%, in particular at least 20% of the light entering the second light entry face and exiting through the third light exit face (in particular from a light source of a vehicle headlight or of a motor vehicle headlight, respectively) exits through the third light exit face without having exited from the monolithic body through the second light exit face and without having entered the monolithic body through the third light entry face.

In another embodiment of the invention the third light entry face is located to lie opposite to the second light exit face. In another embodiment of the invention the third light entry face is separated from the second light exit face by a particularly wedge-shaped gap. In an embodiment of the invention the third light exit face amounts to at least 50% of the second light entry face. In another embodiment of the invention the second light entry face amounts to at least 50% of the third light exit face.

In another embodiment of the invention the monolithic body includes at least one optically operative third light entry face. In another embodiment of the invention it is provided for that (the light entry faces and the light exit faces are arranged relative to each other such that) at least 20% of the light entering the third light entry face and exiting through the second light exit face (in particular from a light source of a vehicle headlight or of a motor vehicle headlight, respectively) exits through the second light exit face after having exited from the monolithic body through the first light exit face and having entered the monolithic body through the second light entry face. In another embodiment of the invention it is provided for that (the light entry faces and the light exit faces are arranged relative to each other such that) at least 10%, in particular at least 20% of the light entering the third light entry face and exiting through the second light exit face (in particular from a light source of a vehicle headlight or of a motor vehicle headlight, respectively) exits through the second light exit face without having exited from the monolithic body through the first light exit face and without having entered the monolithic body through the second light entry face.

In another embodiment of the invention the monolithic body comprises a region for imaging an edge of the first light exit face as a light-dark-boundary. The region is, particularly partially, restricted/limited by the second light exit face or by the third light exit face. The edge is, in particular, part of a light tunnel. In the sense of the invention, a light tunnel is in particular characterized in that total reflection essentially occurs at its lateral surfaces so that light entering through the light entry face is guided through the tunnel (which is acting) as a light guide. In the sense of the invention, a light tunnel is in particular a light guide or light conductor. In particular, it is provided for that total reflection occurs at the longitudinal surfaces of the light tunnel. In particular, it is provided for that the longitudinal surfaces of the light tunnel are adapted/provided for total reflection. In particular, it is provided for that total reflection occurs at the surfaces of the light tunnel oriented essentially in the direction of the optical axis of the light tunnel. In particular, it is provided for that the surfaces of the light tunnel essentially oriented in the direction of the optical axis of the light tunnel are adapted/provided for total reflection.

The aforementioned object is, moreover, achieved by an optical component for illumination purposes comprising in particular one or several of the aforementioned features, in particular a headlight lens for a vehicle headlight, in particular for a motor vehicle headlight, wherein the optical component for illumination purposes, in particular the headlight lens includes an in particular blank-molded monolithic body of transparent material including an optically operative first light entry face, an optically operative first light exit face, at least one optically operative second light entry face located opposite to the first light exit face, and at least one optically operative second light exit face.

The aforementioned object is moreover achieved by an optical component for illumination purposes comprising in particular one or several of the aforementioned features for illumination purposes, in particular a headlight lens for a vehicle headlight, in particular for a motor vehicle headlight, wherein the optical component for illumination purposes, in particular the headlight lens includes an in particular blank-molded monolithic body of transparent material including an optically operative first light entry face, an optically operative first light exit face, at least one optically operative second light entry face separated from the first light exit face by a particularly wedge-molded gap, and at least one optically operative second light exit face.

The aforementioned object is moreover achieved by a vehicle headlight, comprising in particular a headlight lens including one or several of the aforementioned features, in particular a motor vehicle headlight, wherein the vehicle headlight includes a light source irradiating (also to be termed as 'launching', 'introducing' or 'coupling') light into or making it enter the first light entry face. In an embodiment of the invention the light source includes at least one LED or an array of LED's. In an expedient embodiment of the invention the light source comprises at least one OLED or an array of OLED's. For example the light source may as well be a plane luminous field. The light source may also include light element chips as have been disclosed by DE 103 15 131 A1.

The aforementioned object is moreover achieved by a method for manufacturing an optical component, comprising, in particular, one or several of the aforementioned features, for illumination purposes, in particular a headlight lens for a vehicle headlight, in particular for a motor vehicle headlight, wherein the optical component for illumination purposes, in particular the headlight lens includes a monolithic body of transparent material including an optically operative first light entry face, an optically operative first light exit face, at least one optically operative second light entry face for receiving light exiting from the first light exit face, and at least one optically operative second light exit face, wherein the monolithic body is blank-molded between a first partial mold and at least one second partial mold such that a first region of the first light entry face is formed by means of the first partial mold, and a second region of the first light entry face is molded by means of the second partial mold;

that a first region of the first light exit face is formed by means of the first partial mold, and a second region of the first light exit face is formed by means of the second partial mold;

that a first region of the second light entry face is formed by means of the first partial mold, and a second region of the second light entry face is formed by means of the second partial mold and/or that a first region of the second light exit face is formed by means of the first partial mold, and a second region of the second light exit face is formed by means of the second partial mold.

During pressing/during the injection process it is, in particular, provided for that the first partial mold and the second partial mold are moved to approach each other. Herein, the first partial mold may be made to approach the second partial mold and/or the second partial mold can be made to approach the first partial mold.

Alternatively, the aforementioned optical components or headlight lenses, respectively, may be manufactured by means of a common (pressure) injection molding procedure. Furthermore, the aforementioned optical components or headlight lenses may be manufactured alternatively by means of a procedure disclosed in DE 11 2008 003 157, wherein it is, in particular, provided for that a blank of glass is heated such that it assumes a viscosity of between $10^4$ Pa*s and $10^5$ Pa*s, in particular of between $10^4$ Pa*s and $5 \cdot 10^5$ Pa*s, and wherein the blank is press-molded after heating in an injection (pressure) mold to (press-) form a headlight lens.

The aforementioned object is, moreover, achieved by a headlight lens—comprising, in particular, one or several of the aforementioned features—for a vehicle headlight, in particular for a motor vehicle headlight, wherein the headlight lens includes a particularly blank-molded monolithic body of transparent material including at least one optically operative light entry face and at least one optically operative light exit face, and wherein the monolithic body comprises a light tunnel which, via a bend or a (blank-molded) curve or curvature, respectively, and (by way of transition) passes over into a light passage section.

In an embodiment of the invention the light tunnel is arranged between the bend or curve, respectively, and the light entry face. In another embodiment of the invention the light passage section is arranged between the bend or curve, respectively, and the light exit face. In another embodiment of the invention the bend or curve, respectively, comprises an opening angle of at least 90°. In a further expedient embodiment of the invention the bend or curve, respectively, comprises an opening angle of no more than 150°. In another embodiment of the invention the bend or curve, respectively, is arranged on that surface of the light passage guide section which is facing the light entry face. In a further expedient embodiment of the invention the light passage section is configured for imaging the bend as a light-dark-boundary. In another embodiment of the invention the monolithic body comprises at least one second light tunnel, which passes over into or merges with the light passage guide section with a bend or via a curve/curvature, respectively.

It is, in particular, provided for that the surface of the headlight lens does not show a break or discontinuity in the bend, but rather has a curve or curvature. In an embodiment of the radius of curvature is no more than 5 mm. In an expedient embodiment the radius of curvature is no more than 0.25 mm, in particular no more than 0.15 mm, advantageously no more than 0.1 mm. In another embodiment of the invention the radius of curvature of the curvature in the bend is at least 0.05 mm. In another embodiment of the invention the radius of curvature of the curve in the bend is approximately 50 nm. It is, in particular, provided for that the surface of the headlight lens is blank-molded in the area of the bend.

The aforementioned object is, moreover, achieved by a headlight lens—comprising in particular one or several of the aforementioned features—for a vehicle headlight, in particular for a motor vehicle headlight, wherein the headlight lens includes a particularly blank-molded monolithic body of transparent material including an optically operative first light entry face, an optically operative first light exit face, at least one optically operative second light entry face, and at least one optically operative second light exit face.

In an embodiment of the invention at least 20% of the light entering the first light entry face and exiting through the second light exit face exits through the second light exit face after having exited from the monolithic body through the first light exit face and having entered the monolithic body through the second light entry face. In another embodiment of the invention at least 10%, in particular at least 20% of the light entering the first light entry face and exiting through the second light exit face exits through the second light exit face without having exited from the monolithic body through the first light exit face and without having entered the monolithic body through the second light entry face. In another embodiment of the invention at least 90% of the light entering the first light entry face and exiting through the second light exit face exits through the second light exit face after having exited from the monolithic body through the first light exit face and having entered the monolithic body through the second light entry face. In another embodiment of the invention the monolithic body comprises a region for imaging an edge of the first light exit face as a light-dark-boundary. In another embodiment of the invention the monolithic body is configured as a light tunnel between the first light entry face and the first light exit face.

The aforementioned object is, moreover, achieved by a vehicle headlight, in particular a motor vehicle headlight, wherein the vehicle headlight has a headlight lens comprising in particular one or several of the aforementioned features—as well as a light source for irradiating light into or making it enter the first light entry face. In an embodiment of the invention the light source comprises at least one LED or an array of LED's. In an expedient embodiment of the invention the light source comprises at least one OLED or an array of OLED's. For example, the light source may as well be a plane luminous field. The light source may also comprise light element-chips as have been disclosed by DE 103 15 131 A1. A light source may also be a laser. A laser to be used has been disclosed in ISAL 2011 Proceedings, page 271ff.

In a further expedient embodiment of the invention the vehicle headlight has no secondary optic associated with the headlight lens. A secondary optic, in the sense of the invention, is in particular an optical device for aligning light which exits from the light exit face or from the second light exit face, respectively. A secondary optic, in the sense of the invention, is in particular an optical element for aligning light separated and/or subordinated with regard to the headlight lens. A secondary optic, in the sense of the invention is, in particular, no cover or protection disc, but an optical element provided for aligning light. As an example of a secondary optic, there is disclosed e.g. a secondary lens in DE 10 2004 043 706 A1.

In the sense of the invention, a motor vehicle is, in particular, a land vehicle to be used individually in road traffic. In the sense of the invention, motor vehicles are, in particular, not restricted to land vehicles including a combustion engine.

DETAILED DESCRIPTION

Figure 1:
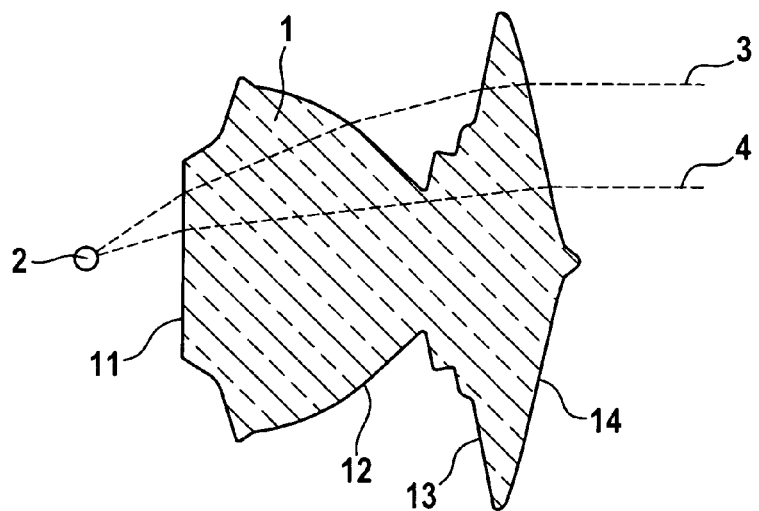
FIG. 1 shows an example of an embodiment of a motor vehicle headlight.

FIG. 1 shows a motor vehicle headlight including an LED 2 and an optical component for illumination purposes configured as a rotation-symmetric headlight lens 1 having a blank-molded monolithic body of transparent material, which includes an optically operative (effective) light entry face 11, an optically operative light exit face 12, an optically operative (effective) light entry face 13, and an optically operative (effective) light exit face 14. The light exit face 12 and the light entry face 13 lie in opposition to each other and form a circumferential wedge-molded gap.

The LED 2 and the headlight lens 1 are arranged, with respect to each other, such that light emitted from the LED 2 enters the headlight lens 1 through the light entry face, as has been depicted, by way of example, by means of a light beam 3 and a light beam 4. Herein, the light beam 3 enters the headlight lens 1 through the light entry face 11, exits from the headlight lens 1 through the light exit face 12, enters the headlight lens 1 again through the light entry face 13, and exits anew from the headlight lens 1 through the light exit face 14. The light beam 4 enters the headlight lens 1 through the light entry face 11 and exits through the light exit face 14, however, without exiting through the light exit face 12 or entering the light entry face 13. A reflecting layer or a reflector may be provided for to guide the light emitted by the LED 2 to the light entry face 11.

Figure 2:
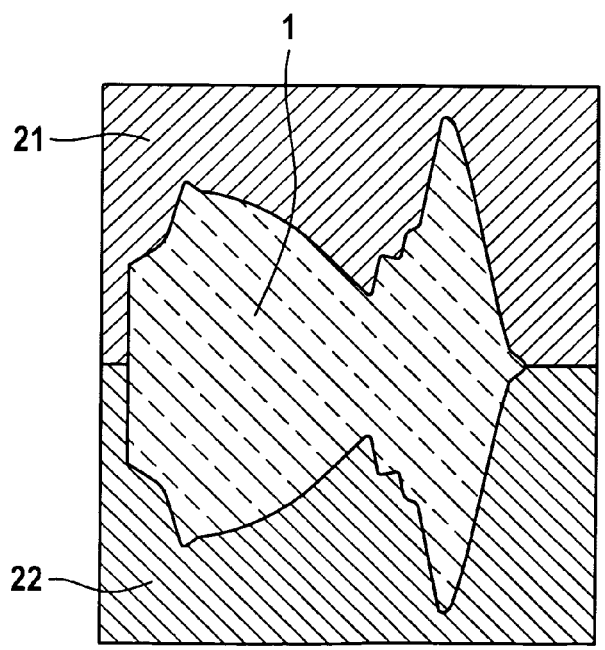
FIG. 2 shows an example of embodiment of a method for manufacturing a headlight lens for a motor vehicle headlight according to FIG. 1.

FIG. 2 shows a process for manufacturing the headlight lens 1. Herein, the headlight lens 1 is blank-molded between a partial mold 21 and a partial mold 22, wherein the light entry face 11 is molded by means of the partial mold 21 as well as by means of the partial mold 22, wherein the light exit face 12 is molded by means of the partial mold 21 as well as by means of the partial mold 22, wherein the light entry face 13 is formed by means of the partial mold 21 as well as by means of the partial mold 22, and wherein the light exit face 14 is formed by means of the partial mold 21 as well as by means of the partial mold 22. During injection, i.e. when exerting pressure, it may, in particular, be provided for that the partial mold 21 and the partial mold 22 are (positioned relative to each other and) made to approach each other. Herein, the partial mold 21 may be made to approach the partial mold 22, and/or the partial mold 22 may approach the partial mold 21. The partial mold 21 and the partial mold 22 are made to approach each other long enough until they contact each other or form a closed overall mold, respectively.

Figure 3:
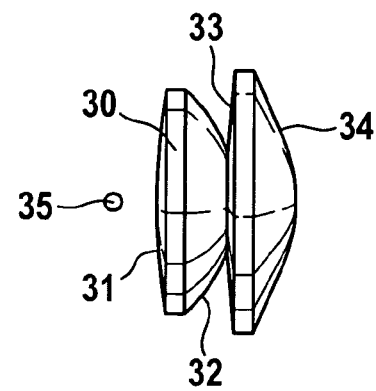
FIG. 3 shows an example of embodiment of an optical component for illumination purposes.

FIG. 3 shows an alternatively configured optical component 30 for illumination purposes having a blank-molded monolithic body of transparent material, which includes an optically operative light entry face 31, an optically operative light exit face 32, an optically operative light entry face 33, and an optically operative light exit face 34. An LED 35 is associated with the, wherein the LED 35 and the optical component 30 are arranged relative to each other such that light emitted from the LED 35 enters the optical component 30 through the light entry face 31.

Figure 4:
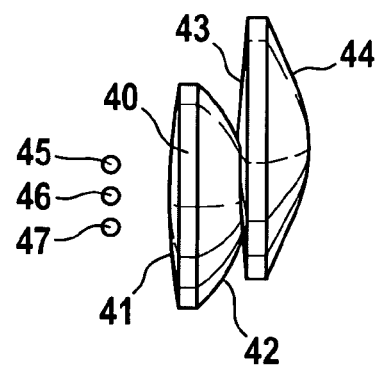
FIG. 4 shows a further example of embodiment of an optical component for illumination purposes.

FIG. 4 shows a further alternatively configured optical component 40 for illumination purposes having a blank-molded monolithic body of transparent material, which includes an optically operative light entry face 41, an optically operative light exit face 42, an optically operative light entry face 43, and an optically operative light exit face 44. LEDs 45, 46, 47 are associated with the optical component 40, wherein the LEDs 45, 46, 47 and the optical component 40 are arranged relative to each other such that light emitted from the LEDs 45, 46, 47 enters the optical component 40 through the light entry face 41.

Figure 5:
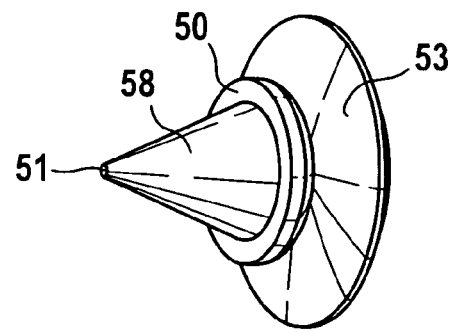
FIG. 5 shows a further example of embodiment of an optical component for illumination purposes.
Figure 6:
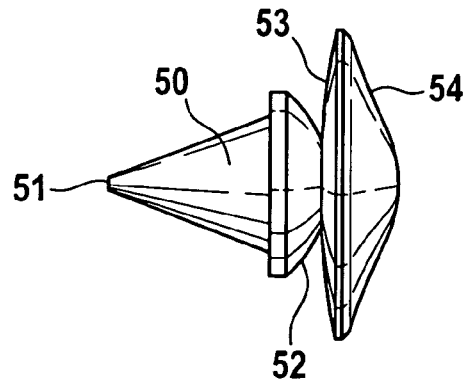
FIG. 6 shows a side view of the optical component according to FIG. 5.

FIG. 5 shows a further alternatively configured optical component for illumination purposes 50 by way of a perspective rear view, and FIG. 6 shows the optical component for illumination purposes 50 by way of a side elevation. The optical component 50 for illumination purposes comprises a blank-molded monolithic body of transparent material, which includes an optically operative light entry face 51, an optically operative light exit face 52, an optically operative light entry face 53, and an optically operative light exit face 54. An LED may be arranged on the light entry face 51. The optical component 50 for illumination purposes may also be used as a solar concentrator, wherein the light exit faces 52 and 54 are light entry faces and the light entry faces 51 and 53 are light exit faces, and wherein the cone 58 forms a light guide or a light tunnel, respectively.

Figure 7:
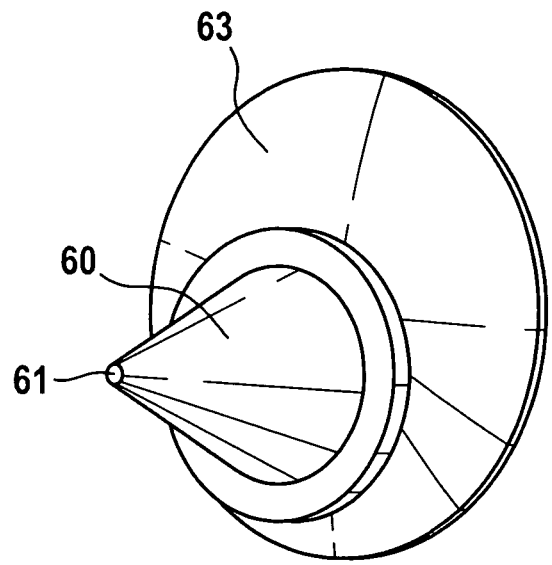
FIG. 7 shows a further example of embodiment of an optical component for illumination purposes.
Figure 8:
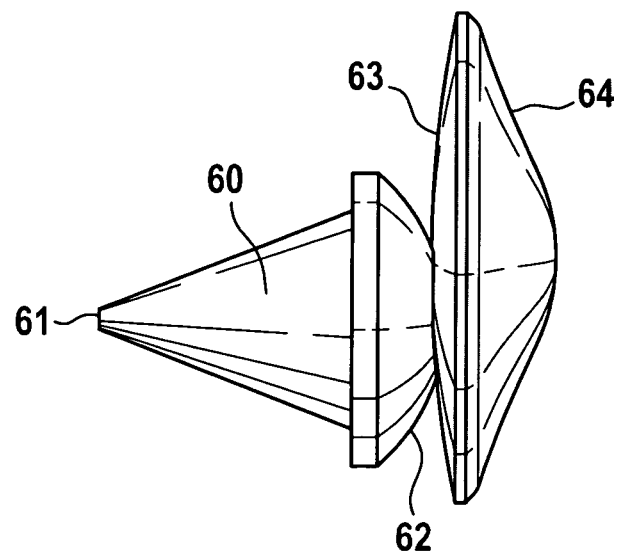
FIG. 8 shows a side view of the optical component according to FIG. 7.

FIG. 7 shows a further alternatively configured optical component for illumination purposes 60 by way of a perspective rear view, and FIG. 6 shows the optical component for illumination purposes 50 by way of a side elevation. The optical component 60 for illumination purposes comprises a blank-molded monolithic body of transparent material, which includes an optically operative light entry face 61, an optically operative light exit face 62, an optically operative light entry face 63, and an optically operative light exit face 64. An LED may be arranged on the light entry face 51.

Figure 9:
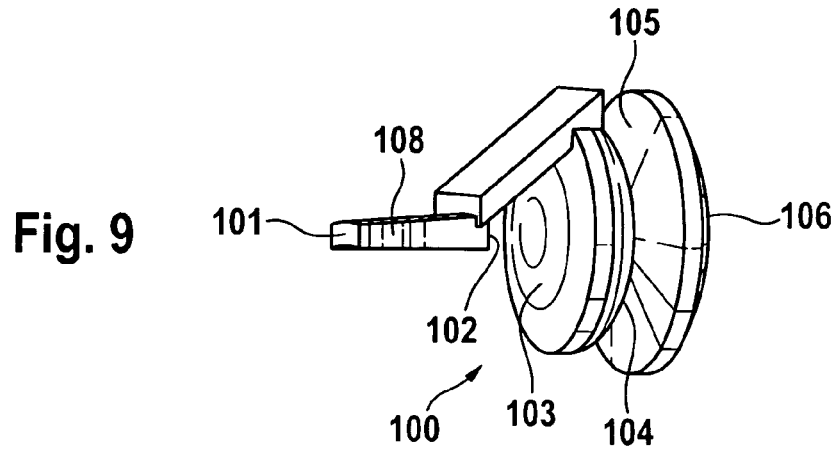
FIG. 9 shows an example of an embodiment of a headlight lens by way of a perspective representation.
Figure 10:
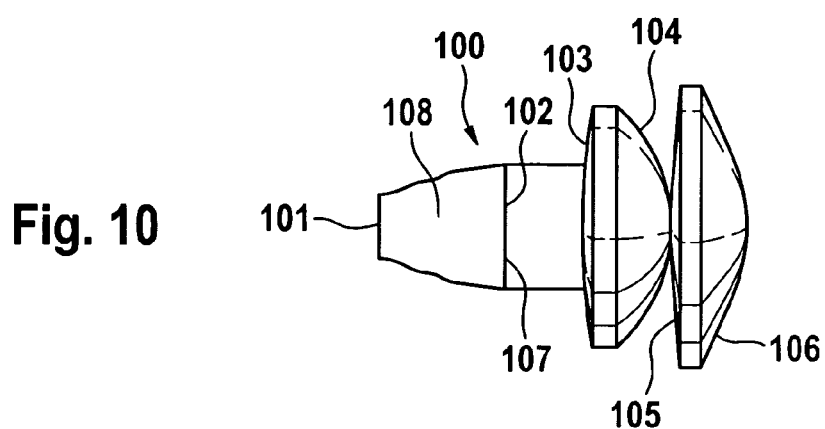
FIG. 10 shows the headlight lens according to FIG. 9 by way of a bottom view (view from below)
Figure 11:
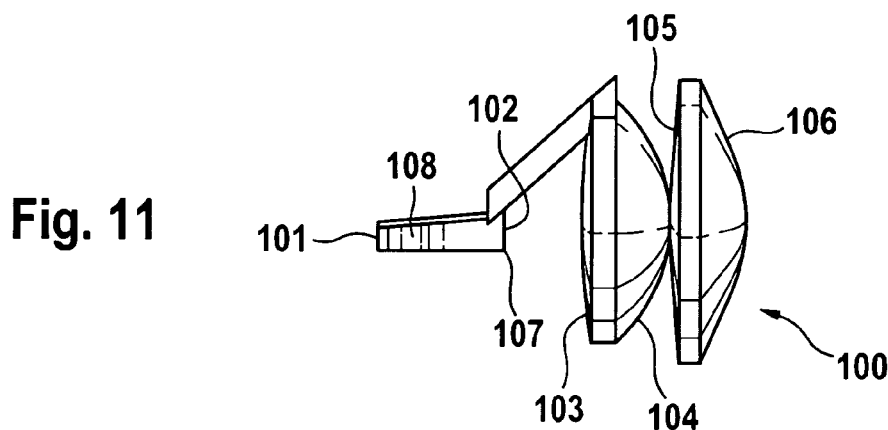
FIG. 11 shows the headlight lens according to FIG. 9 by way of a side view.
Figure 12:
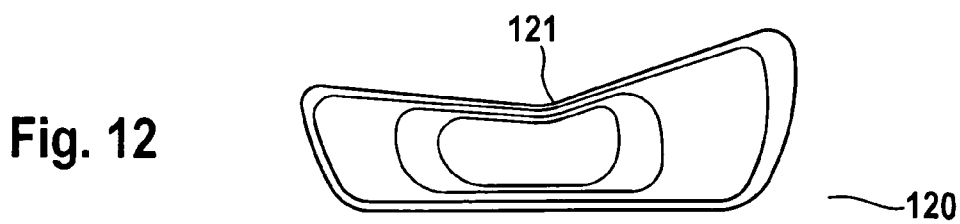
FIG. 12 shows an example of embodiment of an area illuminated by means of the headlight lens according to FIG. 9 at a distance of 10 m in front of the headlight lens according to FIG. 9.

FIG. 9 shows an example of embodiment of a headlight lens 100 for a motor vehicle headlight by way of a perspective rear view, wherein the headlight lens 100 is represented by way of a bottom view (view from below) in FIG. 10 and by way of a side view in FIG. 11. The headlight lens 100 comprises a blank-molded monolithic body of transparent material, which body comprises a light tunnel 108 having a light entry face 101 and a light exit face 102. The blank-molded monolithic body or the headlight lens 100, respectively, comprises, moreover, a light entry face 103, through which light which exits through the light exit face 102 from the headlight lens 100 enters the headlight lens 100 anew. In addition, the headlight lens 100 comprises a further light exit face 104, a further light entry face 105, as well as a further light exit face 106. The light exit face 102 comprises an upper edge 107, which edge is imaged as a light-dark-boundary 121, as represented in FIG. 12, by means of an area (or of a light passage section) of the headlight lens 100, which area is restricted by the light entry face 103 and the light exit face 106, wherein reference numeral 120 designates the illuminated area at a distance of 10 m in front of the headlight lens 100, which area is illuminated by means of the headlight lens 100—when light is irradiated into or made to enter, respectively, the headlight lens 100 for example by means of a light strip element through the light entry face 101.

Figure 13:
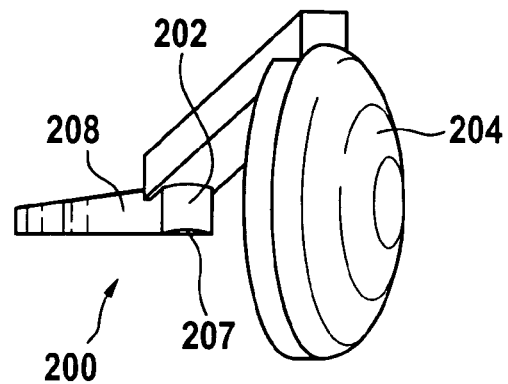
FIG. 13 shows a further example of embodiment of a headlight lens by way of a perspective representation.
Figure 14:
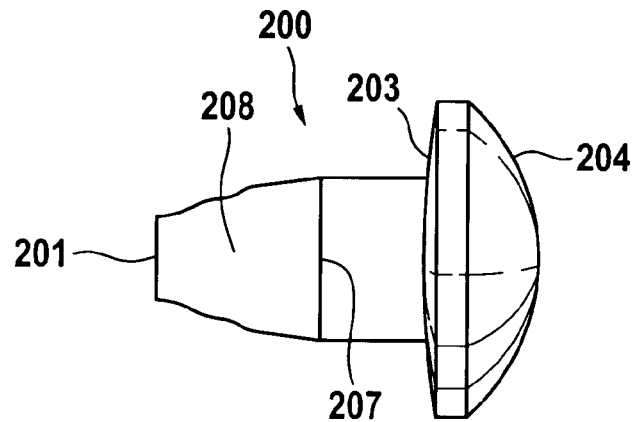
FIG. 14 shows the headlight lens according to FIG. 13 by way of a bottom view (view from below)
Figure 15:
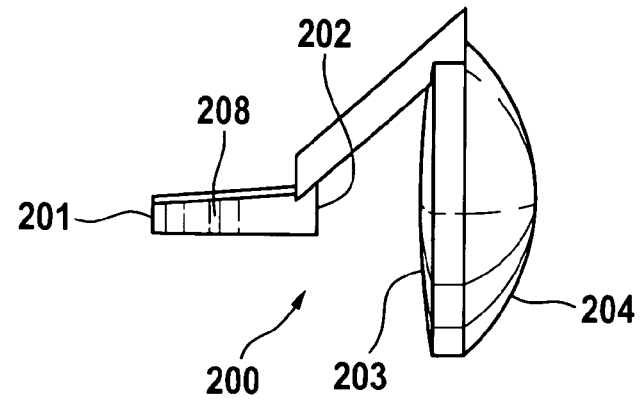
FIG. 15 shows the headlight lens according to FIG. 13 by way of a side view.

FIG. 13 shows a further example of embodiment of a headlight lens 200 for a motor vehicle headlight by way of a perspective front view, wherein the headlight lens 200 is represented in FIG. 14 by way of a bottom view (view from below) and in FIG. 15 by way of a side view. The headlight lens 200 comprises a blank-molded monolithic body of transparent material, which body comprises a light tunnel 208 having a light entry face 201 and a light exit face 202. The blank-molded monolithic body or the headlight lens 200, respectively, moreover comprises a light entry face 203, through which light, which exits from the headlight lens 200 through the light exit face 202, enters the headlight lens 200 anew. In addition, the headlight lens 200 comprises a further light exit face 204. The light exit face 202 comprises an upper edge 207, which is imaged as a light-dark-boundary by means of an area (or light passage section, respectively) of the headlight lens 200, which area is restricted by the light entry face 203 and the light exit face 204, said imaging occurring when light is irradiated into or made to enter, respectively, the headlight lens 200, for example by means of a light strip element through the light entry face 201.

Figure 16:
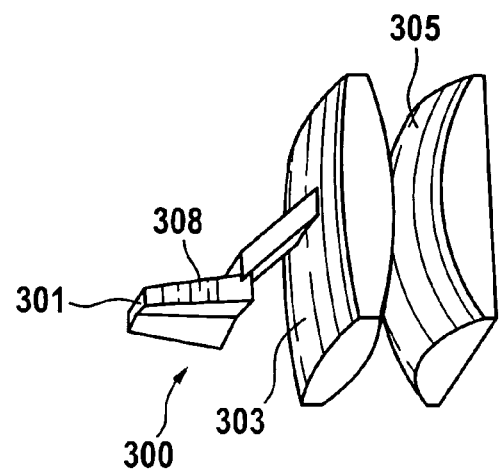
FIG. 16 shows a further example of embodiment of a headlight lens by way of a perspective representation.
Figure 17:
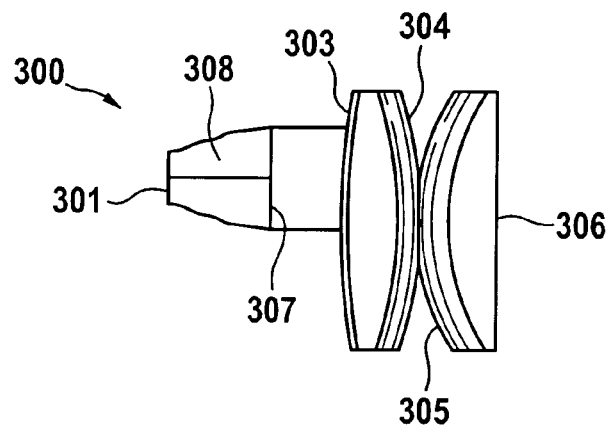
FIG. 17 shows the headlight lens according to FIG. 16 by way of a bottom view (view from below)
Figure 18:
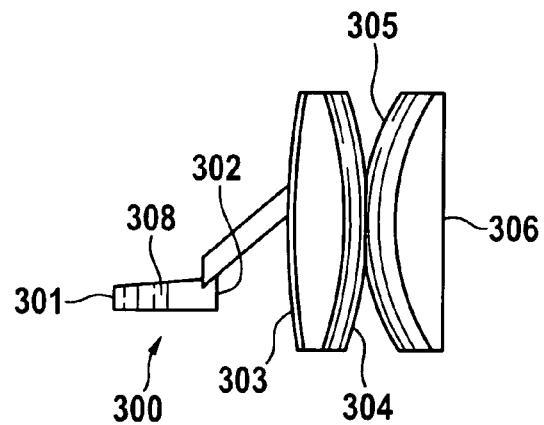
FIG. 18 shows the headlight lens according to FIG. 16 by way of a side view.

FIG. 16 shows a further example of embodiment of a headlight lens 300 for a motor vehicle headlight by way of a perspective rear view, wherein the headlight lens 300 is represented by way of a bottom view (view from below) in FIG. 17 and by way of a side view in FIG. 18. The headlight lens 300 comprises a blank-molded monolithic body from transparent material, which body comprises a light tunnel 308 having a light entry face 301 and a light exit face 302. The blank-molded monolithic body or the headlight lens 300, respectively, moreover comprises a light entry face 303, through which light, which exits from the headlight lens 300 through the light exit face 302, enters the headlight lens 300 anew. In addition, the headlight lens 300 comprises a further light exit face 304, a further light entry face 305, as well as a further light exit face 306. The light exit face 302 comprises an upper edge 307, which is imaged as a light-dark-boundary by means of an area (or light passage section, respectively) of the headlight lens 300, which area is restricted by the light entry face 303 and the light exit face 306, said imaging occurring when light is irradiated into or made to enter, respectively, the headlight lens 300 for example by means of a light strip element through the light entry face 301.

Figure 19:
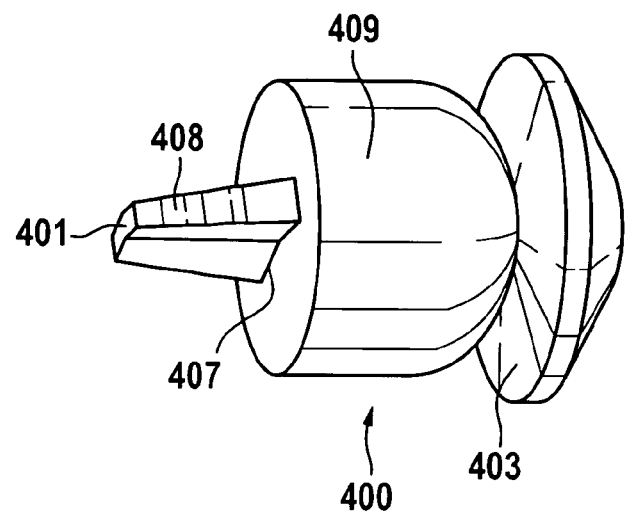
FIG. 19 shows a further example of embodiment of a headlight lens by way of a perspective representation.
Figure 20:
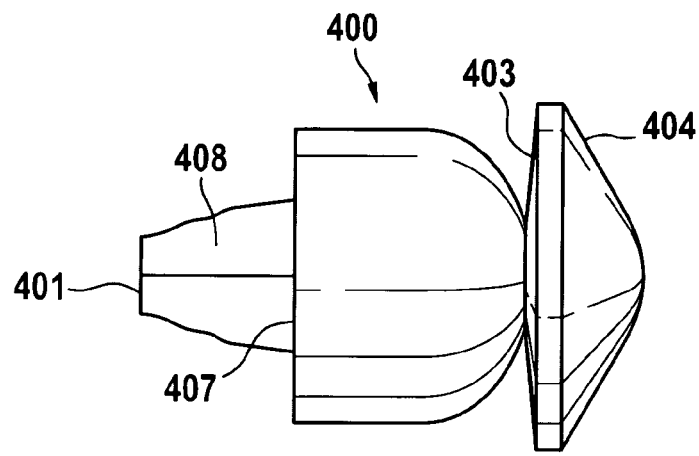
FIG. 20 shows the headlight lens according to FIG. 19 by way of a bottom view (view from below)
Figure 21:
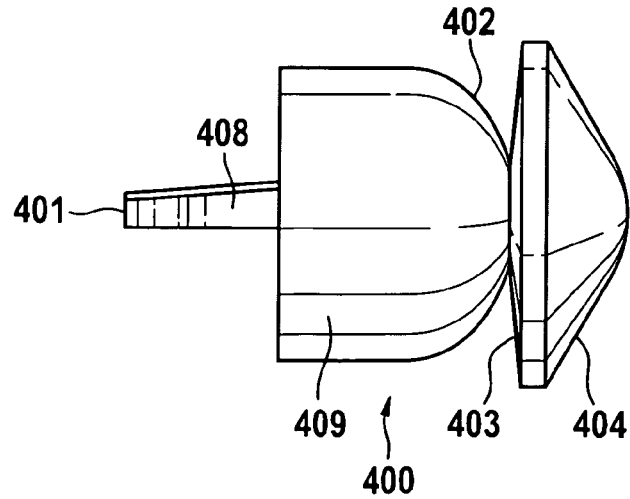
FIG. 21 shows the headlight lens according to FIG. 19 by way of a side view.
Figure 22:
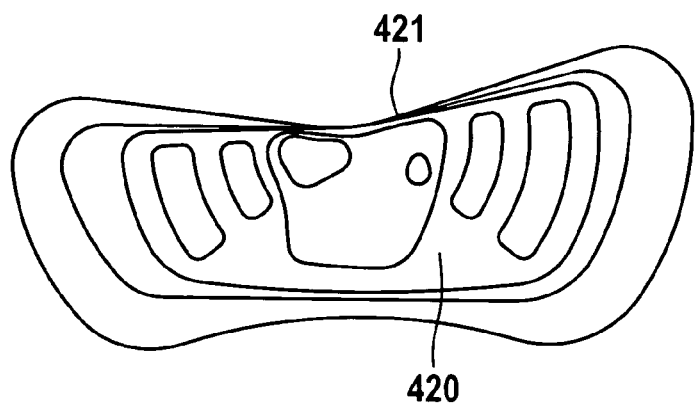
FIG. 22 shows an example of embodiment of an area illuminated by means of the headlight lens according to FIG. 20 at a distance of 10 m in front of the headlight lens according to FIG. 20.

FIG. 19 shows a further example of embodiment of a headlight lens 400 for a motor vehicle headlight by way of a perspective rear view, wherein the headlight lens 400 is represented by way of a bottom view (view from below) in FIG. 20 and by way of a side view in FIG. 21. The headlight lens 400 comprises a blank-molded monolithic body of transparent material, which body comprises a light tunnel 408 having a light entry face 401 on one side and transiting into a light passage section (or portion) 409 via a bend (or via a curvature, respectively) 407, on the other side, which light passage section includes a light exit face 402, a light entry face 403, as well as a further light exit face 404. Herein, the light passage section 409 images the bend 407, as has been represented in FIG. 22, as a light-dark-boundary 421, wherein reference numeral 420 designates the area illuminated by means of the headlight lens 400 at a distance of 10 m in front of the headlight lens 400,—when light is irradiated into or made to enter, respectively, the headlight lens 400 for example by means of a light strip element through the light entry face 401.

Figure 23:
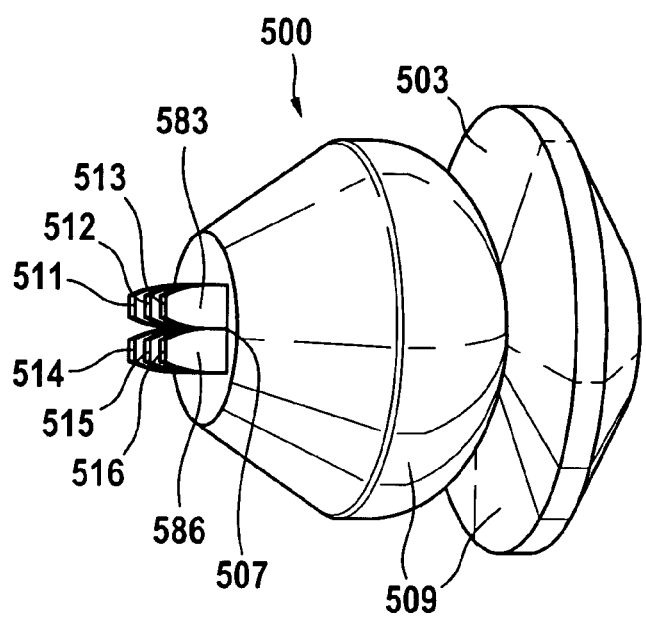
FIG. 23 shows a further example of embodiment of a headlight lens by way of a perspective representation.
Figure 24:
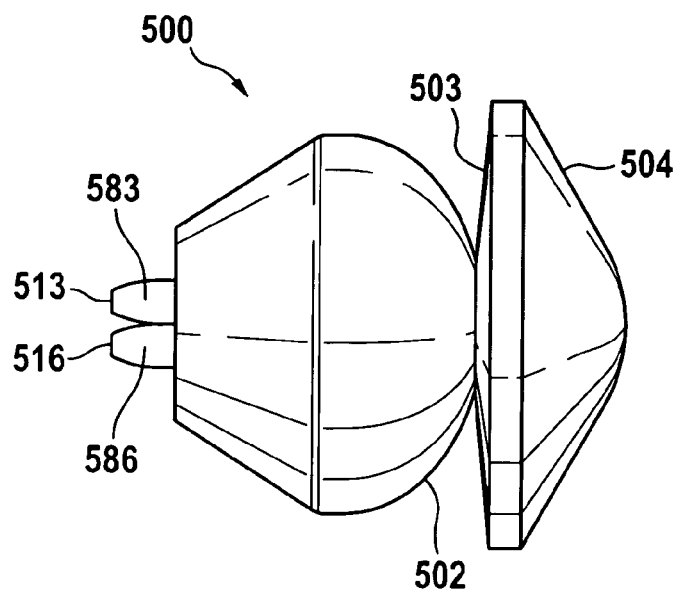
FIG. 24 shows the headlight lens according to FIG. 23 by way of a side view.

FIG. 23 shows an example of embodiment of a headlight lens 500 for a motor vehicle headlight by way of a perspective rear view and modified with respect to headlight lens 400, wherein the headlight lens 500 is represented by way of a side view in FIG. 24. The headlight lens 500 comprises a blank-molded monolithic body of transparent material including six light tunnels 583, 586 including corresponding light entry faces 511, 512, 513, 514, 515, 516, with which have been associated non-shown LEDs for making light enter the light entry faces 511, 512, 513, 514, 515, 516. The light tunnels 583, 586 transit into a light passage section 509 by means of a bend (or a curvature, respectively) 507 on their side facing away from the light entry faces 511, 512, 513, which light passage section 509 has a light exit face 502, a light entry face 503, as well as a further light entry face 504. Herein, the light passage section images the bend 507 as a light-dark-boundary.

The invention claimed is:

1. An optical component for illumination purposes, the optical component comprising: a monolithic body of transparent material, the monolithic body including a first light entry face; a first optically operative light exit face; a second optically operative light entry; a second optically operative light exit face; and a light tunnel between first light entry face and the first light exit face; wherein at least 20% of the light entering the first light entry face and exiting through the second light exit face exits through the second light exit face after having exited from the monolithic body through the first light exit face and having entered the monolithic body through the second light entry face.

2. The optical component of claim 1, wherein at least 10% of the light entering the first light entry face and exiting through the second light exit face exits through the second light exit face without having exited from the monolithic body through the first light exit face and without having entered the monolithic body through the second light entry face.

3. The optical component of claim 2, wherein the second light entry face is located opposite to the first light exit face.

4. The optical component of claim 2, wherein the second light entry face is separated from the first light exit face by a gap.

5. The optical component of claim 4, wherein the second light entry face is separated from the first light exit face by a wedge-shaped gap.

6. The optical component of claim 1, wherein the second light entry face is located opposite to the first light exit face.

7. The optical component of claim 1, wherein the second light entry face is separated from the first light exit face by a gap.

8. The optical component of claim 7, wherein the second light entry face is separated from the first light exit face by a wedge-shaped gap.

9. An optical component for illumination purposes, the optical component comprising: a monolithic body of transparent material, the monolithic body including a first light entry face; a first optically operative light exit face; a second optically operative light entry face located opposite to the first light exit face; a second optically operative light exit face; and a light tunnel between first light entry face and the first light exit face and wherein at least 10% of the light entering the first light entry face and exiting through the second light exit face exits through the second light exit face without having exited from the monolithic body through the first light exit face and without having entered the monolithic body through the second light entry face.

10. The optical component of claim 9, wherein the second light entry face is separated from the first light exit face by a gap.

11. The optical component of claim 10, wherein the second light entry face is separated from the first light exit face by a wedge-shaped gap.

12. The optical component of claim 9, wherein the second light entry face is separated from the first light exit face by a gap.

13. The optical component of claim 12, wherein the second light entry face is separated from the first light exit face by a wedge-shaped gap.

14. An optical component for illumination purposes, the optical component comprising: a blank-molded monolithic body of transparent material, the monolithic body including a first light entry face; a first optically operative light exit face; a second optically operative light entry face separated from the first light exit face by one of the group consisting of a gap and a wedge-shaped gap; a second optically operative light exit face; and a light tunnel between first light entry face and the first light exit face and wherein at least 10% of the light entering the first light entry face and exiting through the second light exit face exits through the second light exit face without having exited from the monolithic body through the first light exit face and without having entered the monolithic body through the second light entry face.

* * * * *